US006648585B2

(12) United States Patent
Block et al.

(10) Patent No.: US 6,648,585 B2
(45) Date of Patent: Nov. 18, 2003

(54) RETRACTABLE DEVICE FOR FLIPPING A WORKPIECE, PARTICULARLY A MATTRESS OF OTHER CUSHION STRUCTURE

(75) Inventors: Paul Block, Nesconset, NY (US); Charles Block, deceased, late of N. Bellmore, NY (US), Paul Block, executor

(73) Assignee: Galkin Automated Products, Corp., West Babylon, NY (US)

( * ) Notice: Subject to any disclaimer, the term of this patent is extended or adjusted under 35 U.S.C. 154(b) by 88 days.

(21) Appl. No.: 10/012,877

(22) Filed: Oct. 22, 2001

(65) Prior Publication Data

US 2002/0057962 A1 May 16, 2002

Related U.S. Application Data

(60) Provisional application No. 60/242,728, filed on Oct. 24, 2000.

(51) Int. Cl.[7] .............................................. B65G 47/248

(52) U.S. Cl. ......................... 414/759; 414/771; 414/779

(58) Field of Search ........................... 112/2.1; 198/403, 198/409; 414/759, 769, 771, 779

(56) References Cited

U.S. PATENT DOCUMENTS 3,490,061 A * 1/1970 Docker ......................... 112/2.1
3,967,723 A 7/1976 Beckham
4,095,700 A * 6/1978 Chiuaru et al. ............. 414/759
4,175,655 A 11/1979 Baldwin
4,533,291 A 8/1985 Nishida
4,821,656 A * 4/1989 Dordi et al. ................. 112/2.1
4,890,717 A 1/1990 Kane
4,969,552 A 11/1990 Kennicutt et al.
5,395,205 A 3/1995 Dugas et al.
5,515,796 A 5/1996 Ogle et al.

FOREIGN PATENT DOCUMENTS

EP 0 682 135 A1 11/1995
JP 50-36821 * 11/1975 ................. 414/771

* cited by examiner

*Primary Examiner*—Janice L. Krizek
(74) *Attorney, Agent, or Firm*—Keusey, Tutanjian & Bitetto, P.C.

(57) ABSTRACT

A material handling method and apparatus for flipping a workpiece. The method involves raising a retracted arm out of the worksurface to pivot the workpiece up and away from an edge of the worksurface. The workpiece is then slid in the direction of the edge before being guided thought the remainder of its 180 degree rotation. The guiding step further slides the workpiece toward the edge so that the workpiece is flipped at least partially in place. The apparatus for carrying out the method includes an arm and catcher plate both having an idle position below the worksurface. Pneumatic drives under microprocessor control pivot, slide and flip the workpiece, at least partially in place. An optical sensor array monitors a peripheral area around the worksurface which may be smaller than the workpiece. The drives may be halted upon the array sensing movement of the workpiece beyond a certain distance from the worksurface periphery.

14 Claims, 2 Drawing Sheets

RETRACTABLE DEVICE FOR FLIPPING A WORKPIECE, PARTICULARLY A MATTRESS OF OTHER CUSHION STRUCTURE

CROSS REFERENCE TO RELATED APPLICATIONS

This application claims the benefit of copending provisional application Serial No. 60/242,728 filed on Oct. 24, 2000, the contents of which is incorporated herein by reference thereto.

BACKGROUND OF THE INVENTION

1. Field of the Invention

The invention relates to a retractable device for flipping a large workpiece on a worktable. More particularly, it relates to pivoting arms, embedded below the surface of a finishing table, which extend upwardly to support and linearly translate the pivoting corner of the mattress, box spring, foundation or other cushion structure.

2. Description of the Prior Art

In the manufacture of mattresses, box springs, foundations or other cushion structures, the workpiece undergoes finishing, e.g. a tape edging process. The finishing process occurs on a finishing table having a work surface. Typically, the work surface has a smaller area than the larger mattresses, whereby the mattress extends off the work surface on all sides to provide easy access to all sides of the mattress. After the upper edge of the mattress is finished, the mattress needs to be flipped to allow finishing of the mattress' lower edge.

The weight and size of the larger mattresses present a bulkiness that hinders handling and flipping. In the case of manual handling, flipping the mattress is difficult, dangerous and presents a production bottleneck since it is time consuming to support and flip the mattress safely. In the case of automated handling, the mattress is transported to a separate, outboard turning system. These outboard systems are expensive to acquire and install. In addition they occupy large areas in crowded manufacturing floors that adds to their maintenance costs.

An example of a stand alone turning devices may be seen in U.S. Pat. No. 3,967,723 and U.S. Pat. No. 4,175,655. The vertical extensions of these devices prevent their incorporation into work surfaces as they would interfere with the finishing process. A low profile turnover device may be seen in U.S. Pat. No. 4,890,717. However, this device is installed beneath a conveyor belt that provides a large surface to flip the workpiece onto. Accordingly, it would be desirable to provide a flipping device that allows a large workpiece to be flipped, in place, on a surface which is smaller than the workpiece. In addition, such a device should be embedded into the work surface, effectively hidden out of the way, when not in use.

SUMMARY OF THE INVENTION

It is therefore an object of the invention to flip a workpiece over onto a worksurface which may be smaller than the workpiece.

It is a further object of the invention to utilize supporting arms which are fully retractable below the worksurface during an idle state of the apparatus.

It is yet another object of the invention to incorporate a safety feedback sensor array to halt operation of the apparatus if the workpiece travels beyond a present distance outbound of the worksurface.

These and other related objects are achieved initially according to the invention by a method for flipping a workpiece on a worksurface having an edge. The method essentially employs a first step of raising a retracted arm out of the work surface to pivot the workpiece up and away from the edge; a second step of sliding the arm and the workpiece toward the edge; and a third step of guiding the workpiece through a 180° rotation so that the workpiece is flipped, at least partially in place, back onto the worksurface. The arms engage a lower corner of the workpiece farthest from the edge, and in a practical embodiment of same a support arm contacts a lower surface of the workpiece and a bracket arm contacts a side surface of the workpiece farthest from the edge. Computer control of pneumatic drives coordinate movement of the arms.

A sensor array provides sensor data to the computer control about the position of the workpiece, and halts operation of the pneumatic drives if the workpiece travels a present distance beyond a periphery of the worksurface. Ideally, the sensor data is obtained from an optical sensor array arranged a preset distance outbound of the worksurface periphery.

The method according to the invention is carried out by a material handling system wholly mounted within a worktable having a worksurface with an edge. The system includes an arm having an initial position within the worktable below the worksurface; a mechanical drive coupled to the arm for raising the arm to pivot the workpiece up and away from the edge and for subsequently sliding the arm and the workpiece toward the edge; and a catcher plate for guiding the workpiece through a 180 degree rotation so that the workpiece is flipped, at least partially in place, back onto the worksurface. Pneumatic drives elevate a retracted support arm into engagement with a lower surface of the workpiece, and a retracted bracket arm into engagement with a side surface of the workpiece farthest from the edge.

In a practical embodiment a microprocessor is coupled to the pneumatic drives for coordinating movements of the support and bracket arm and the catcher plate. An optical sensor array is coupled to the microprocessor for providing sensor data about the position of the workpiece in relationship to the worksurface. Upon receiving sensor data that the workpiece has encountered the optical sensor array, the microprocessor halts operation of the drives.

BRIEF DESCRIPTION OF THE DRAWINGS

In the drawings wherein like reference numeral denote similar components throughout the views.

DETAILED DESCRIPTION OF PREFERRED EMBODIMENTS

Figure 1:
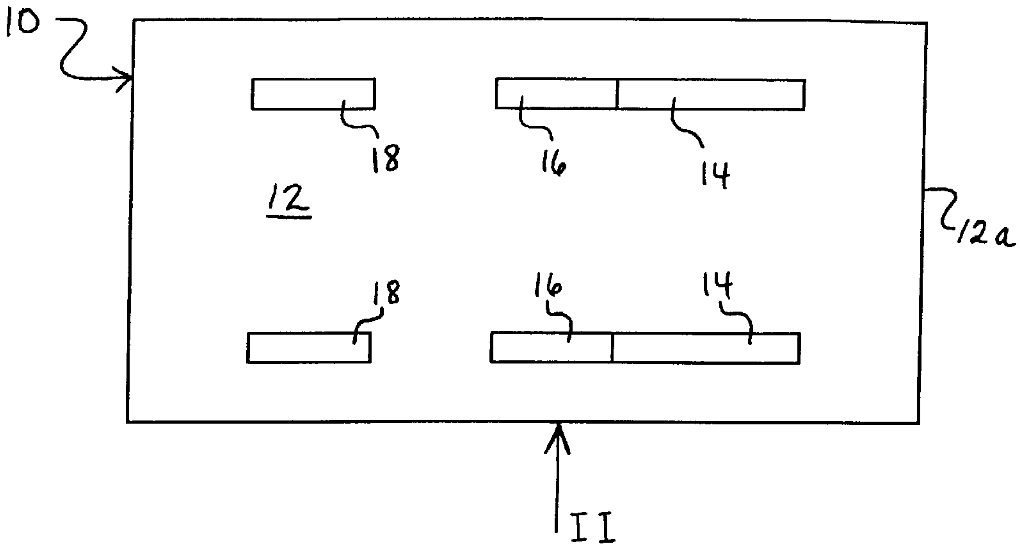
FIG. 1 is a top plan view of the worksurface schematically illustrating the location and configuration of the arms and catcher plates.
Figure 2:
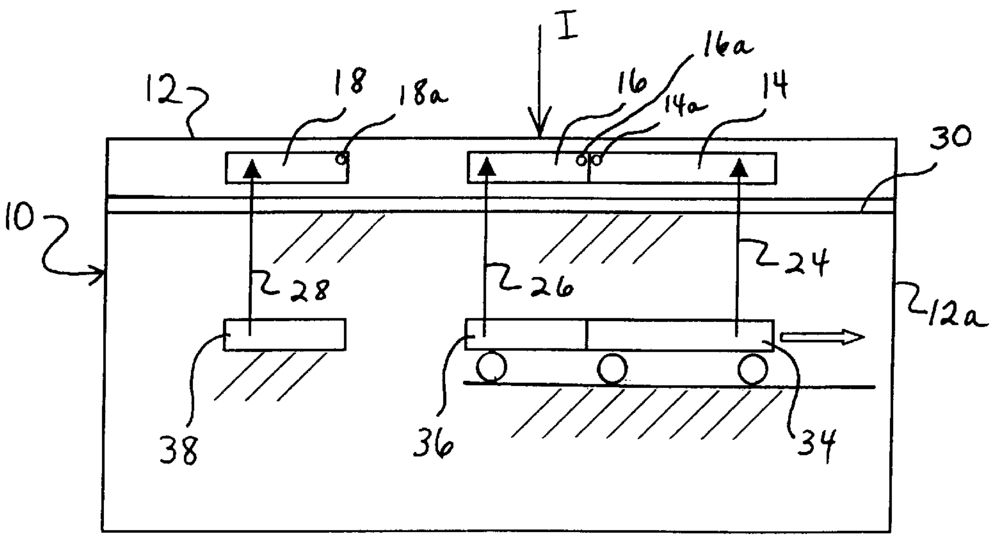
FIG. 2 is a schematic side elevational view, taken from position II of FIG. 1, illustrating the configuration of pivot drives and translational drives within the worktable.

Referring now in detail to the drawings, and in particular FIG. 1, there is shown a worktable, generally indicated by the reference numeral 10, having a worksurface 12, with at least one defined edge 12*a*. Embedded within worktable 12, and preferably retracted below worksurface 12, as can be most readily seen in FIG. 2, are a pair of support arms 14, a pair of bracket arms 16 and a pair of catcher plates 18. While the invention contemplates the use of just one arm and one catcher plate, it possesses particular utility in the mattress manufacturing field. In handling mattresses and other non-rigid workpieces, it has proven useful to provide the paired configuration of arms as shown. In the manufacturing of mattresses, box springs, foundations and other cushion structures, the workpieces are processed on finishing tables. Typically, the finishing tables have smaller dimensions than the workpieces to allow easy access to the entire periphery of the workpiece. This presents a problem in that there is not enough surface area on the worksurfaces to flip the workpiece in an end-over-end fashion. Thus, flipping large, bulky mattresses requires intermediate support thereof which presents logistical problems in the midst of crowded manufacturing floors.

FIG. 2 shows one support arm drive 24 that pivots one end of support arm 14 about axle 14*a*. A bracket arm drive 26 pivots one end of bracket arm 16 about axle 16*a*. A catcher plate drive 28 pivots catcher plate 18 about axle 18*a*. Each arm or plate may be equipped with its own, or a common, drive and axle. The arms and plates and their axles may be supported by a beam 30 so that in their idle states all material handling equipment is below the worksurface. A major benefit of this configuration is that is avoids having equipment mounted to the sides or above the table, which would hinder the operator's access. The lower end of catcher plate drive 28 is mounted to a fixed drive support 38. The lower ends of the arm drives 24 and 26 are mounted to mobile drive supports 34 and 36, which may be fashioned as a sled having independent motive means capable of sliding the sled toward and away from edge 12*a*.

Figure 3:
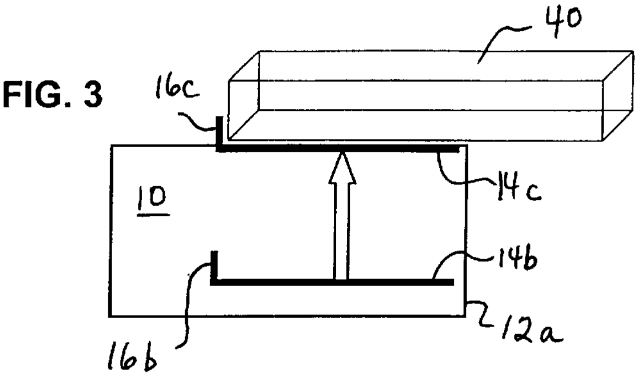
FIG. 3 is a schematic perspective view illustrating the arms moving from their idle, retracted positions into their extended positions above the worksurface into contact with the workpiece.

Since the arms are recessed within the worksurface, their length may be equal to or smaller than the width of the mattress. The arms may have a length on the order of one-half the width of the mattress or cushion. The relatively small arms of the invention are able to effectively flip even large mattresses due to bracket arm 16 which provides complete support of the lower corner of the workpiece. As can be seen in FIG. 3, one or more arms are initially moved from their idle retracted position 14*b* to a raised position 14*c* engaging a lower surface of a workpiece 40. If greater support is needed, for example for a non-rigid workpiece like a mattress, another arm may move from an idle position 16*b* to a raised position 16*c* to engage a side surface of workpiece 40, or wrap around the corner thereof.

Figure 4A:
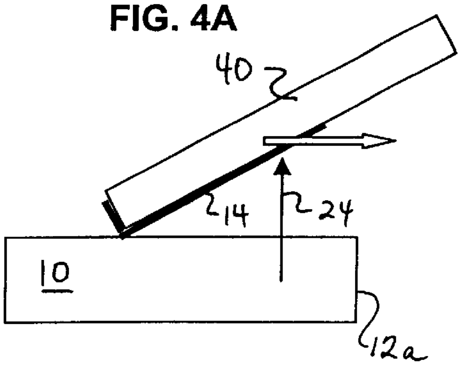
FIGS. 4A and 4B are schematic views illustrating lateral movement of the raised workpiece.
Figure 4B:
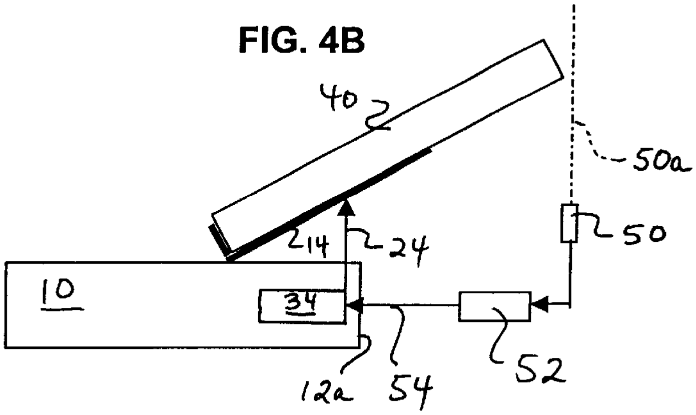

In FIG. 4A, support arm drive 24 pivots support arm 14 upwardly, counter-clockwise away from edge 12*a*. Support arm 14 pivots around its axle, and the workpiece pivots about a similar pivot point. In FIG. 4B, the mobile drive support 34 slides the engaging arms and workpiece toward edge 12*a*. Outboard of edge 12*a,* there is provided a sensor 50, for example and optical sensor, which monitors a boundary 50*a*. Boundary 50*a* is established a present distance from edge 12*a* and represents the farthest position that any workpiece can safely travel. If the workpiece crosses boundary 50*a,* a microprocessor 52 will receive a signal from sensor 50. In response, microprocessor 52 will transmit a halt control signal 54 to all material handling equipment, especially mobile drive support 34.

Figure 5:
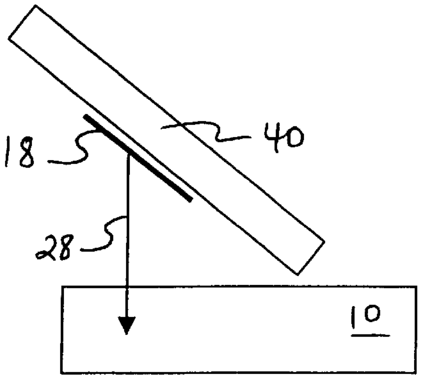
FIG. 5 is a schematic view illustrating guiding of the workpiece through its 180 degree rotation.

In a coordinated pivoting and sliding motion toward edge 12*a,* workpiece 40 will eventually clear enough worksurface to its left to allow it to flip over. As it passes counterclockwise past the 12 o'clock position, catcher plate drive 28 raises catcher plate 18 from its retracted position to a position shown in FIG. 5. Workpiece 40 is safely supported and gradually lowered to its 180 degree flipped position as shown in FIG. 6.

Figure 6:
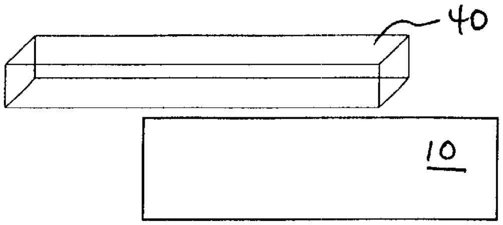
FIG. 6 is a schematic view illustrating the fully rotated position of the workpiece.

As can be readily seen by comparing FIGS. 3 and 6, the starting and ending positions of the mattress overlap a significant center portion of worksurface 12. The device according to the invention not only flips the cushion structure, but also displaces it back in the direction of its original position during the flipping operation. We refer to this as flipping the workpiece at least partially in place.

It will be seen that we have achieved the objects of the invention by providing a method for safely and effectively flipping oversize workpieces onto worksurfaces smaller than the workpiece. Furthermore the material handling system retracts completely into the worksurface in an idle state. The functionality of outbound material handling systems has been fully and effectively integrated into worktables, particularly finishing stations for use in the mattress manufacturing field.

What is claimed is:

1. A method for flipping a workpiece on a work surface having an edge, comprising the steps of:

raising a retracted arm out of the work surface to pivot the workpiece up and away from the edge;

sliding the arm and the workpiece toward the edge; and guiding the workpiece through a 180 degree rotation so that the workpiece is flipped, at least partially in place, back onto the work surface, wherein said raising step comprises engaging a lower corner of the workpiece farthest from the edge, wherein said engaging step comprises contacting a lower surface of the workpiece with a support arm and contacting a side surface of the workpiece farthest from the edge with a bracket arm, and wherein said raising step further comprises actuating pneumatic drives via computer control for coordinating movement of said support arm and said bracket arm.

2. The method of claim 1, wherein said work surface is smaller than the workpiece.

3. The method of claim 1, wherein said guiding step comprises guiding the workpiece toward the edge.

4. A method for flipping a workpiece on a work surface having an edge, comprising the steps of:

raising a retracted arm out of the work surface to pivot the workpiece up and away from the edge;

sliding the arm and the workpiece toward the edge;

guiding the workpiece through a 180 degree rotation so that the workpiece is flipped, at least partially in place, back onto the work surface, providing sensor data to a computer control about the position of the workpiece; and halting operation of pneumatic drives if the workpiece travels a preset distance beyond a periphery of the work surface.

5. The method of claim 4, wherein said sensor data is obtained from an optical sensor array which monitors a boundary located a preset distance outbound of the work surface periphery.

6. A material handling system mounted within a worktable having a work surface with an edge comprising:

an arm having an initial position within the worktable below the work surface;

a mechanical drive coupled to said arm for raising said arm to pivot the workpiece up and away from the edge and for subsequently sliding said arm and the workpiece toward the edge;

a catcher plate for guiding the workpiece through a 180 degree rotation so that the workpiece is flipped, at least partially in place, back onto the work surface;

a support arm for engaging a lower surface of the workpiece;

a bracket arm for engaging a side surface of the workpiece farthest from the edge; and a microprocessor coupled to said mechanical drive for coordinating movements of said support arm and said bracket arm.

7. The system of claim 6, comprising a catcher plate drive coupled to said microprocessor.

8. The system of claim 7, wherein said mechanical drive and said catcher plate drive comprise pneumatic drives.

9. The system of claim 7, wherein the system includes an idle position where (i) said mechanical drive retracts said support arm and said bracket arm below the work surface, and (ii) said catcher plate drive retracts said catcher plate below the work surface.

10. The system of claim 7, wherein said catcher plate drive moves the catcher plate and the workpiece toward the edge.

11. The system of claim 7, further comprising the work surface, and wherein the work surface is smaller than the workpiece.

12. The system of claim 11, further comprising sensors coupled to said microprocessor for providing sensor data about the position of the workpiece in relationship to said work surface.

13. The system of claim 12, wherein said sensors comprise an optical sensor array which monitors a boundary located a preset distance outbound of a periphery of said work surface.

14. The system of claim 13, wherein said microprocessor halts operation of said drives upon receiving sensor data that the workpiece has encountered said boundary.

* * * * *